(12) United States Patent
Tsuji et al.

(10) Patent No.: US 8,713,653 B2
(45) Date of Patent: Apr. 29, 2014

(54) DATA PROCESSING APPARATUS, ACTIVATION CONTROL METHOD, AND COMPUTER-READABLE STORAGE MEDIUM

(75) Inventors: Tadashi Tsuji, Tachikawa (JP); Tsuyoshi Nishida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 166 days.

(21) Appl. No.: 13/536,854

(22) Filed: Jun. 28, 2012

(65) Prior Publication Data

US 2013/0086659 A1   Apr. 4, 2013

(30) Foreign Application Priority Data

Sep. 30, 2011   (JP) ................. 2011-218024

(51) Int. Cl.
*G06F 7/02*      (2006.01)
*G06F 1/00*      (2006.01)
*G06F 21/57*    (2013.01)
*G06F 21/34*    (2013.01)

(52) U.S. Cl.
CPC . *G06F 1/00* (2013.01); *G06F 21/34* (2013.01); *G06F 21/572* (2013.01)
USPC .................... 726/6; 713/185; 380/30; 705/12; 705/50

(58) Field of Classification Search
CPC .......... G06F 1/00; G06F 21/34; G06F 21/572
USPC .............. 726/6; 713/185; 380/30; 705/12, 50
See application file for complete search history.

(56) References Cited

U.S. PATENT DOCUMENTS

| | | | |
|---|---|---|---|
| 2004/0068653 A1 * | 4/2004 | Fascenda | 713/168 |
| 2009/0319798 A1 * | 12/2009 | Ooi et al. | 713/186 |
| 2012/0047368 A1 * | 2/2012 | Chinn et al. | 713/175 |

FOREIGN PATENT DOCUMENTS

JP      2008-160325      7/2008

* cited by examiner

*Primary Examiner* — Beemnet Dada
*Assistant Examiner* — Sayed Beheshti Shirazi
(74) *Attorney, Agent, or Firm* — Blakely, Sokoloff, Taylor & Zafman LLP

(57) ABSTRACT

According to one embodiment, a storage stores secret data, first identification data, and a first random key. A generation module generates first authentication data from the secret data, first identification data, and second identification data of a removable medium. A first verification module determines whether the first authentication data and second authentication in the removable medium are identical. A second verification module determines whether the first random key and a second random key in the removable medium are identical, if the first and second authentication data are identical. An activation module activates the data processing apparatus if the first and second random keys are identical.

7 Claims, 5 Drawing Sheets

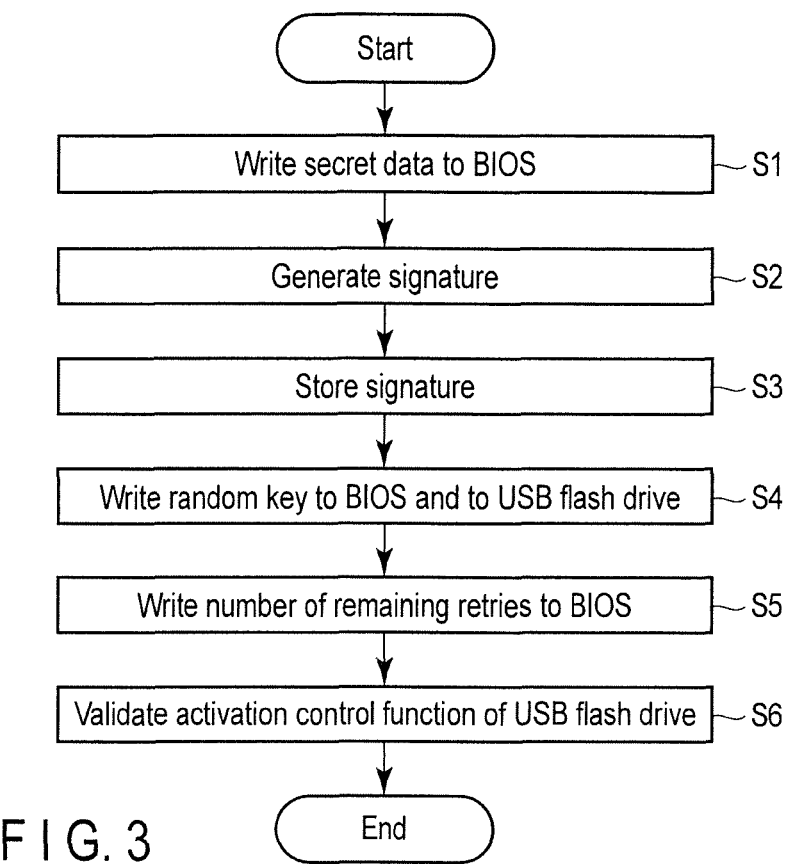
F I G. 3
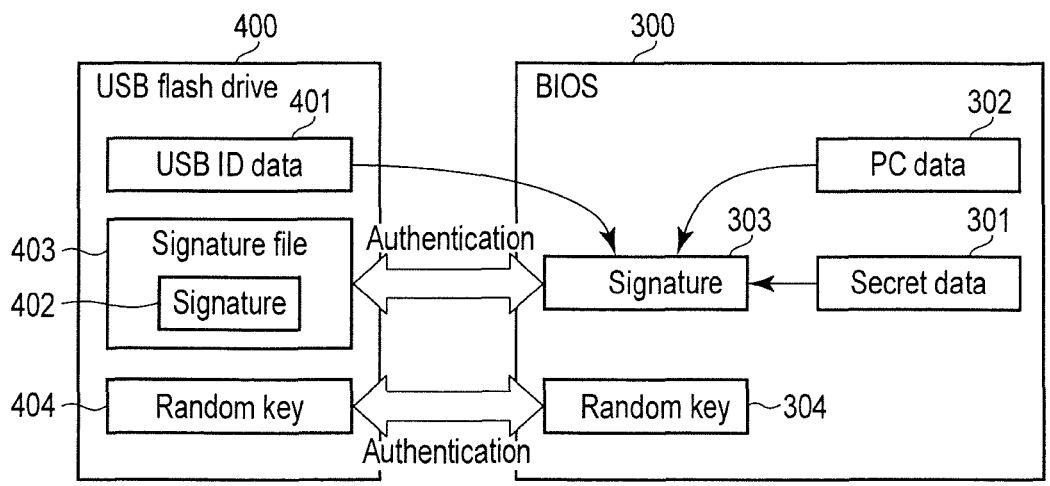
F I G. 4

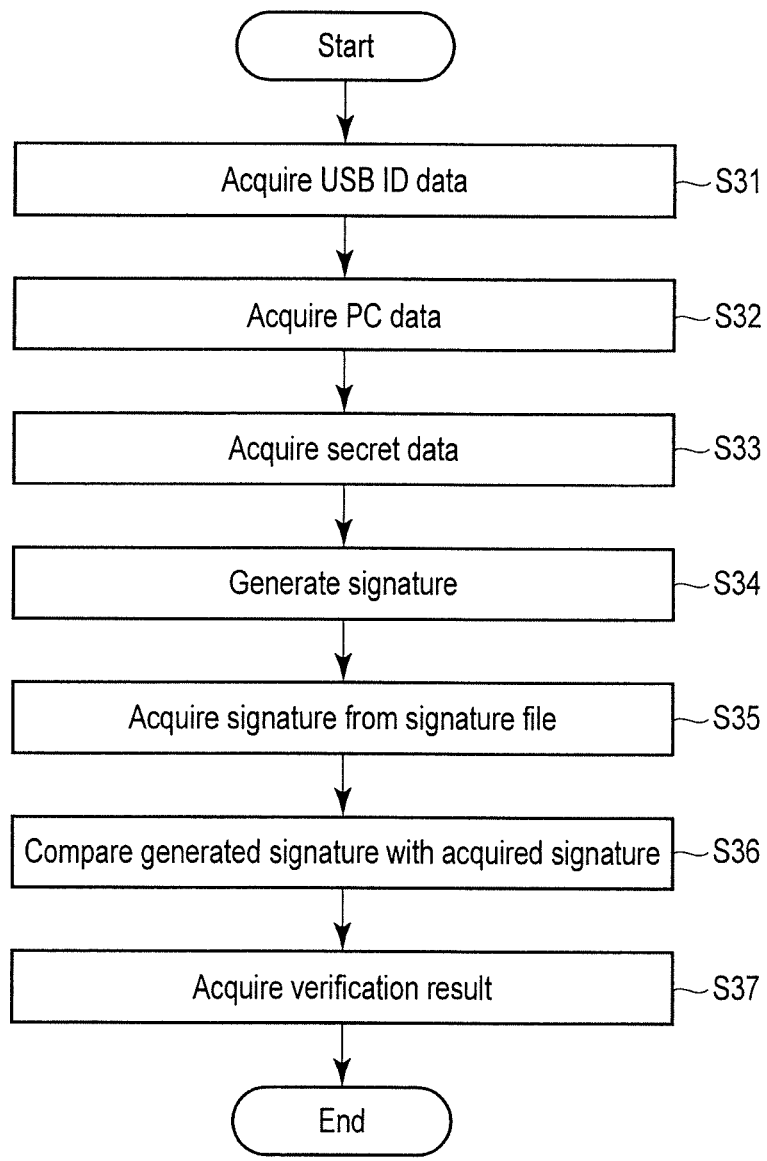
F I G. 6

DATA PROCESSING APPARATUS, ACTIVATION CONTROL METHOD, AND COMPUTER-READABLE STORAGE MEDIUM

CROSS-REFERENCE TO RELATED APPLICATIONS

This application is based upon and claims the benefit of priority from prior Japanese Patent Application No. 2011-218024, filed Sep. 30, 2011, the entire contents of which are incorporated herein by reference.

FIELD

Embodiments described herein relate generally to a data processing apparatus, an activation control method, and a computer-readable storage medium.

BACKGROUND

In recent years, various types of data processing apparatuses, such as personal computers (PCs), PDAs, tablet computers and smartphones, have been developed.

Generally, to activate such a data processing apparatuses, the password known to only the authenticated user should be input to the apparatus in some cases.

Assume that the authenticated user of the data processing apparatus has informed any other person of the password, because the apparatus needs to be activated at a specified time only. Then, the person who now knows the password may thereafter activate the data processing apparatus.

That is, anyone who knows the password can activate the data processing apparatus that can be activated only if the password is input to it.

This is undesirable in consideration of data security. Some measures must be taken to enable only the authenticated user to activate the data processing apparatus.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a flowchart showing the sequence of the process of validating the activation control performed in the data processing apparatus according to the embodiment.

FIG. 4 is a diagram explaining the operation of the data processing apparatus according to the embodiment.

FIG. 6 is a flowchart showing the sequence of a signature verification process.

DETAILED DESCRIPTION

Various embodiments will be described hereinafter with reference to the accompanying drawings.

In general, according to one embodiment, a data-processing apparatus includes a storage module, an acquisition module, a generation module, a first verification module, a second verification module, and an activation module. The a storage module is configured to store secret data prepared for generating authentication data, first ID data inherent to the data processing apparatus and a first random key containing a random value. The acquisition module is configured to acquire second ID data inherent to a removable medium connected to the data processing apparatus, from the removable medium. The generation module is configured to generate first authentication data from the secret data and the first ID data, both stored in the storage module, and the second ID data acquired by the acquisition module. The first verification module is configured to compare the generated first authentication data with the second authentication data stored in the removable medium, thereby to determine whether the first authentication data and the second authentication data are identical. The second verification module is configured to compare the first random key stored in the storage module with a second random key stored in the removable medium, thereby to determine whether the first and second random keys are identical, if the first authentication data and the second authentication data are identical. The activation module is configured to activate the data processing apparatus if the first and second random keys are identical.

Embodiments will be described with reference to the accompanying drawings.

Figure 1:
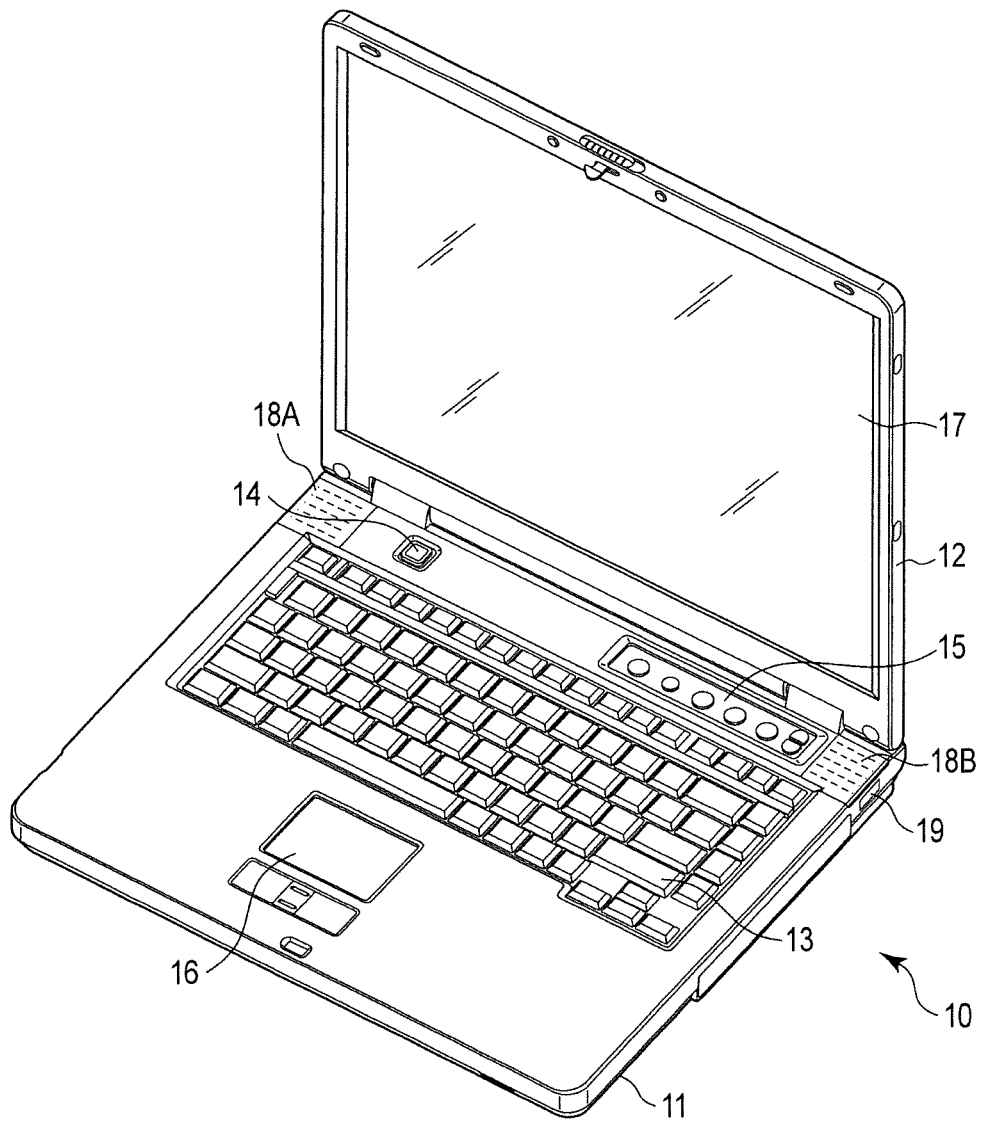
FIG. 1 is a perspective view showing a data processing apparatus according to an embodiment.

FIG. 1 is a perspective view showing a data processing apparatus according to an embodiment. The data processing apparatus is an electronic apparatus such as a personal computer (PC), a PDA, a tablet computer or a smartphone. Here, it is assumed that the apparatus is a personal computer 10 of the notebook type.

As shown in FIG. 1, the computer 10 comprises the computer proper 11 and a display module 12. The display module 12 incorporates a liquid crystal display (LCD) 17. The display module 12 is secured to the computer proper 11 and can rotate between an opened position and a closed position. At the opened position, the display module 12 exposes the upper surface of the computer proper 11. At the closed position, the display module 12 covers the upper surface of the computer proper 11.

The computer proper 11 takes the form of a thin box. On the upper surface of the computer proper 11, a keyboard 13, a power button 14, an input operation panel 15, a pointing device 16, and speakers 18A and 18B are arranged. When pressed, the power button 13 turns the computer 10 on or off. The pointing device 16 is, for example, a touchpad. On the input operation panel 15, various operation buttons are arranged.

On the right side of the computer proper 11, a Universal Serial Bus (USB) socket 19 is provided. Into the USB socket 19, peripheral components, such as a USB flash drive (removable medium), can be inserted. The computer proper 11 includes an external display connection socket (not shown) at the back thereof. The socket accords with, for example, the High-Definition Multimedia Interface (HDMI) standard. The external display connection socket is used to output digital video signals to an external display.

Figure 2:
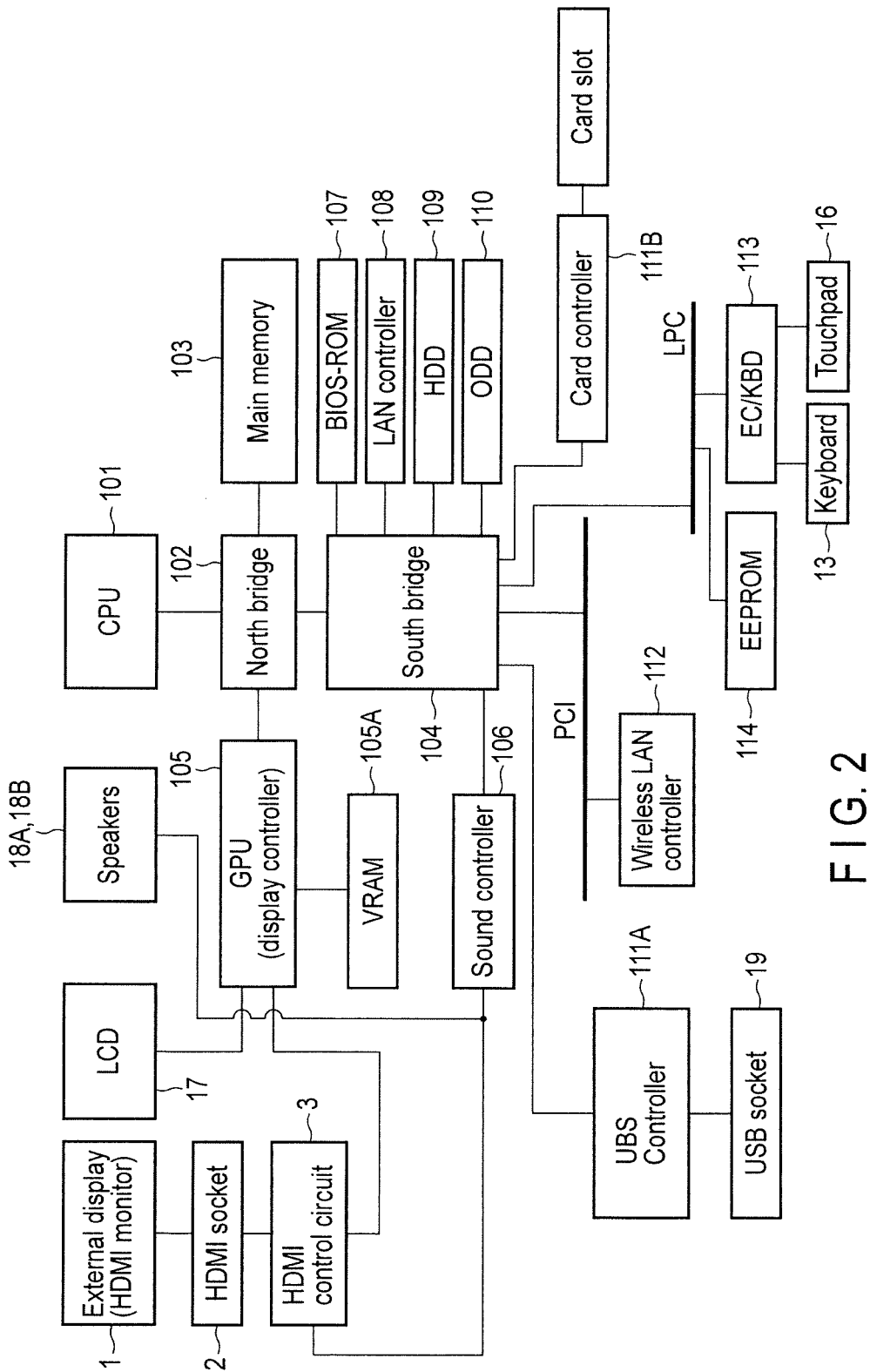
FIG. 2 is a block diagram showing the system configuration of the data processing apparatus according to the embodiment.

FIG. 2 is a diagram showing the system configuration of the computer 10.

As shown in FIG. 2, the computer 10 comprises a CPU 101, a north bridge 102, a main memory 103, a south bridge 104, a graphics processing module (GPU) 105, a video RAM (VRAM) 105A, a sound controller 106, a BIOS-ROM 107, a LAN controller 108, a hard disk drive (HDD) 109, an optical disk drive (ODD) 110, a USB controller 111A, a card controller 111B, a wireless LAN controller 112, an embedded controller/keyboard controller (EC/KBC) 113, and an EEPROM 114.

The CPU 101 is a processor that control the modules incorporated in the computer 10. The CPU 101 executes the operating system (OS), various utility programs and various application programs, all loaded from the HDD 109 into the main memory 103.

The CPU 101 also executes the Basic Input/Output System (BIOS) stored in the BIOS-ROM 107. The BIOS is a program designed to control the hardware. The BIOS includes an activation control program.

The activation control program is a program designed to control the activation of the computer (i.e., data processing apparatus) 10 as will be described later, by using a removable medium, such as a USB flash drive, plugged into the USB socket 19.

The north bridge 102 is a bridge device that connects the local bus of the CPU 101 to the south bridge 104. The north bridge 102 incorporates a memory controller that controls the access to the main memory 103. The north bridge 102 has the function of performing communication with the GPU 105 via, for example, a serial bus of EXPRESS standard.

The GPU 105 is a display controller that controls the LCD 17 used as the display monitor of the computer 10. The display signal the GPU 105 generates is sent to the LCD 17. The GPU 105 can also send a digital video signal to the external display 1 through an HDMI control circuit 3 and an HDMI socket 2.

The HDMI socket 2 is the external display connection socket mentioned above. The HDMI socket 2 can output a digital video signal and a digital audio signal, both uncompressed, to the external display 1, such as a television receiver, through one cable. The HDMI control circuit 3 is an interface used to supply the digital video signal to the external display 1 or "HDMI monitor" through the HDMI socket 2.

The south bridge 104 controls each device provided on a Peripheral Component Interconnect (PCI) bus and each device provided on a Low Pin Count (LPC) bus. The south bridge 104 incorporates an Integrated Drive Electronics (IDE) controller that controls the HDS 109 and the ODD 110. Further, the south bridge 104 has the function of communicating with the sound controller 106.

The sound controller 106 is a sound source device. It outputs the audio data to be played back, to the speakers 18A and 18B or to the HDMI control circuit 3.

The LAN controller 108 is a wired communication device configured to perform wired communication of, for example, the IEEE 802.3 standard. By contrast, the wireless LAN controller 112 is a wireless communication device configured to perform wireless communication according to, for example, the IEEE 802.11 standard.

The USB controller 111A performs communication with an external device connected to it via the USB socket 19.

The card controller 111B is configured to write and read data to and from the memory card that is inserted into the card slot formed in the computer proper 11.

The EC/KBC 113 is a single-chip microcomputer in which an embedded controller and a keyboard controller are provided and integrated together. The embedded controller is configured to achieve power control. The keyboard controller is configured to control the keyboard 13 and touchpad 16. The EC/KBC 113 has the function of turn on and off the computer 10 in response to the user's pushing of the power button 14.

How the computer 10 according to this embodiment operates will be explained below. The computer 10 according to the present embodiment performs a process of validating the activation control and a process of controlling the activation.

The process of validating the activation control is a process for preparing, on the OS, the data indispensable to the activation control in the present embodiment. The process of controlling the activation is a process for controlling the activation of the computer 10, by utilizing a removable media.

The removable media used in this embodiment is, for example, a USB flash drive or an SD card. However, the following description is based on the assumption that the removable media is a USB flash drive. Note that the USB flash drive used in the embodiment is a versatile USB flash drive.

First, the sequence of the process of validating the activation control will be explained with reference to the flowchart of FIG. 3. As described above, the process of validating the activation control is a process for preparing, in the OS, the data indispensable to the activation control in the present embodiment. This process is executed by the application (dedicated tool) provided as part of the OS.

Assume that at the time of performing the process of validating the activation control, the PC data about the computer 10 has been stored in the nonvolatile memory area (hereinafter referred to as the nonvolatile memory area of the BIOS) managed by the BIOS running on the computer 10. The PC data is data inherent to the computer 10, and contains the serial number allocated to the computer 10.

Also assume that the USB flash drive plugged into the computer 10 stores the USB ID data of the USB flash drive. The USB ID data is inherent to the USB flash drive, and contains, for example, the serial number allocated to the USB flash drive.

The dedicated tool first acquires the secret data prepared for generating a signature (authentication data), which will be described later. The secret data is acquired from a specified application designed to manage the secret data. (This application is managed by the manager of the computer 10 and the like.) That is, the process of validating the activation control is a process executed under the control of the manager.

The dedicated tool writes the secret data, thus acquired, in the nonvolatile memory area of the BIOS running on the computer 10 (Step S1). The secret data is thereby stored in the nonvolatile memory area of the BIOS.

Next, the dedicated tool acquires the PC data from the nonvolatile memory area of the BIOS, and the USB ID data from the USB flash drive 400 plugged into the computer 10.

The dedicated tool then generates (calculates) a signature (authentication data) from the secret data stored in the nonvolatile memory area of the BIOS and the PC data and USB ID data that have been acquired (Step S2).

Various methods of generating the signature are available. The signature may be generated by encrypting the PC data and USB ID data with, for example, the secret data as key. That is, the signature used in this embodiment can be one generated from the secret data, the PC data and the USB ID data.

The dedicated tool stores a signature file containing the signature thus generated, in the USB flash drive plugged into the computer 10 (Step S3).

Next, the dedicated tool generates a random key. The random key has a random number (random value). The dedicated tool writes the random key in the nonvolatile memory area of the BIOS and also in the USB flash drive plugged into the computer 10 (Step S4). The same identical random key is thereby stored in both the nonvolatile memory area of the BIOS and the USB flash drive 400 plugged into the computer 10.

The dedicated tool further writes the number of remaining retries in the nonvolatile memory area of the BIOS (Step S5). Note that the number of remaining retries has been set by the manager.

The dedicate tool validates, in the nonvolatile memory area of the BIOS, the activation control function of the USB flash drive (Step S6). Upon completion of Step S6, the activation control is completely activated.

If the process of validating the activation control is performed as described above, the secret data and the random key are stored in the nonvolatile memory area of the BIOS that runs on the computer 10. Further, the USB flash drive plugged into the computer 10 (i.e., USB flash drive associated with the computer 10) stores the secret data and PC data stored in the nonvolatile memory area of the BIOS, the signature generated from the USB ID data stored in the USB flash drive, and the random key identical to the random key stored in the nonvolatile memory area of the BIOS.

The USB flash drive that can activate the computer 10 is thereby associated with the computer 10. The computer 10 can therefore be activated, by using the USB flash drive as will be explained below.

In this embodiment, the computer 10 and the USB flash drive (i.e., USB flash drive plugged into the computer 10) are associated in a one-to-one relationship, because of the process of validating the activation control is performed as explained above.

The activation control process preformed by the computer 10 according to this embodiment performs will be outlined below, with reference to FIG. 4. The activation control process is performed to activate the computer 10 after the USB flash drive 400 has been plugged into the computer 10 (more precisely, inserted into the USB socket 19 of the computer 10).

In the activation control process, authentication is performed, determining whether the USB flash drive plugged into the computer 10 is a USB flash drive associated with the computer 10 (or whether the USB flash drive can activate the computer 10).

In this embodiment, the activation control process is performed as the CPU 101 executes the BIOS (more precisely, the activation control program stored in the BIOS-ROM 107 described above). In other words, the BIOS have the function of performing the activation control process in the present embodiment.

As shown in FIG. 4, the secret data 301 and the PC data 302 are stored in the nonvolatile memory area of the BIOS 300 that runs on the computer 10. The secret data 301 is data prepared to generate the signature (authentication data) used to control the activation of the computer 10. Note that the secret data 301 is stored in the nonvolatile memory area of the BIOS 300, in the process of validating the activation control. The PC data 302 contains, for example, the serial number allocated to the computer 10.

In the USB flash drive 400 plugged into the computer 10, USB ID data 401 is stored. The USB ID data 401 contains, for example, the serial number allocated to the USB flash drive 400. In the USB flash drive 400, a signature file 403 containing a signature 402 is stored. The signature 402 is data generated from the USB ID data 401 stored in the USB flash drive 400 and the secret data 301 and PC data 302 stored in the computer 10 associated with the USB flash drive 400 (more precisely, in the nonvolatile memory area of the BIOS 300 that is activated in the computer 10). Note that the signature 402 (more precisely, file 403 containing the signature 402) is stored in the USB flash drive 400 in the process of validating the activation control.

In the BIOS 300, the signature (calculated value) 303 is generated from the secret data 301 and PC data 302 stored in the computer 10 and the USB ID data 401 stored in the USB flash drive 400 plugged into the computer 10. The signature 303 is compared with the signature 402 contained in the signature file 403 stored in the USB flash drive 400, thereby to authenticate the USB flash drive 400.

As shown in FIG. 4, a random key 304 is further stored in the nonvolatile memory area of the BIOS 300, and a random key 404 is further stored in the USB flash drive 400. The random key 304 stored in the nonvolatile memory area of the BIOS 300 and the random key 4.04 stored in the USB flash drive 400 are compared with each other to authenticate the USB flash drive 400.

In the activation control process, the computer 10 is activated if the USB flash drive 400 plugged into the computer 10 is a USB flash drive associated with the computer 10.

Figure 5:
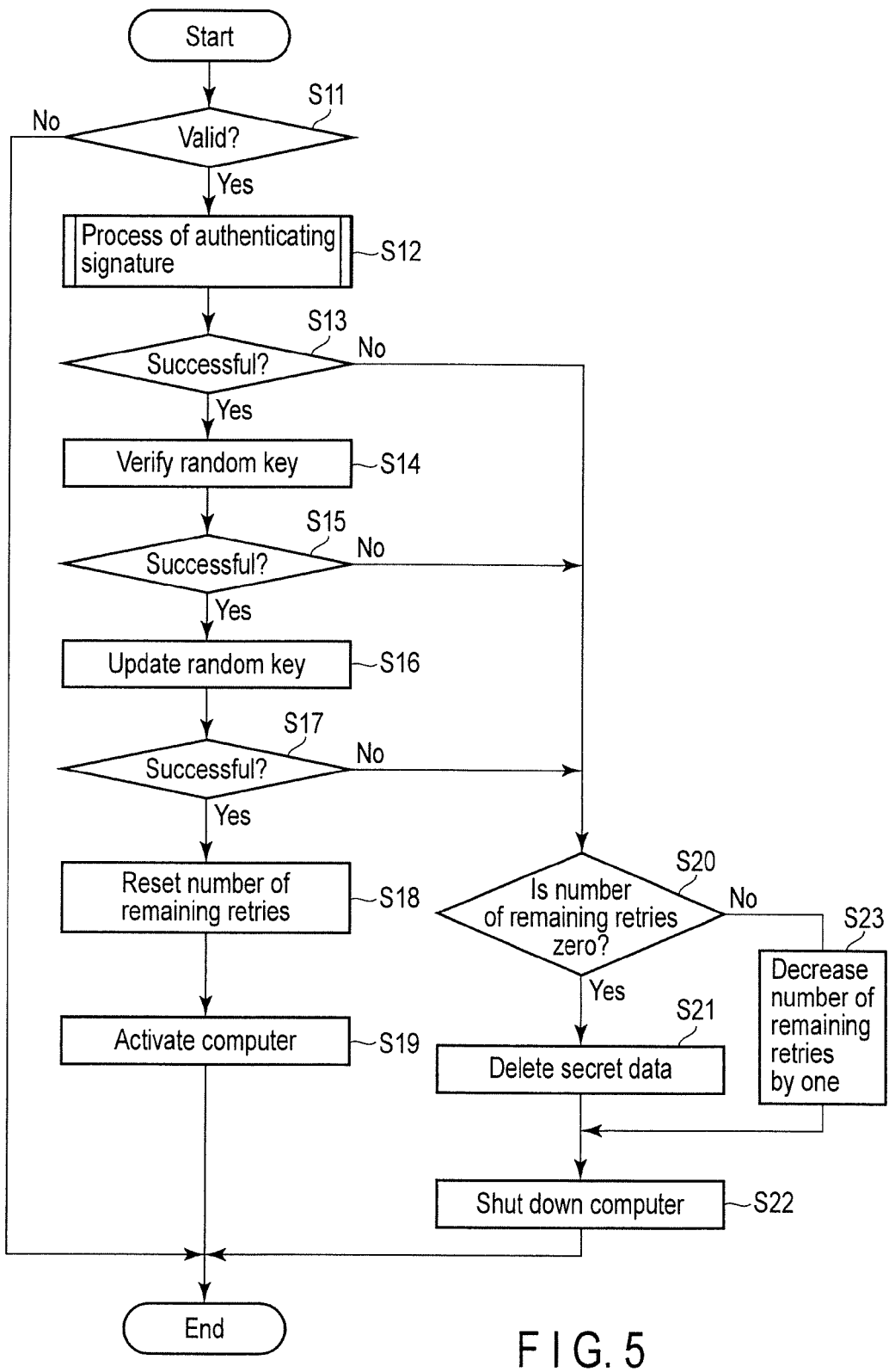
FIG. 5 is a flowchart showing the sequence of the activation control process performed in the data processing apparatus according to the embodiment.

The sequence of the activation control process outlined above will be explained in detail, with reference to the flowchart of FIG. 5. As stated above, the activation control process is executed to activate the computer 10 by using the USB flash drive 400.

As described above, the activation control process is performed as the CPU 101 executes the BIOS stored in the BIOS-ROM 107 (more precisely, the activation control program contained in the BIOS). For sake of convenience, the activation control process will be explained on the assumption that the BIOS 300 shown in FIG. 4 performs the activation control process.

In this embodiment, the USB flash drive 400 must be plugged into the computer 10 in order to activate the computer 10. The USB flash drive 400 plugged into the computer 10 for this purpose will hereinafter be referred to as the associated USB flash drive 400.

Assume that the associated USB flash drive 400 stores the signature 402 and the random key 403 since the above-mentioned process of validating the activation control has been performed.

First, the BIOS 300 refers to the nonvolatile memory area of the BIOS 300, determining whether the activation control function of the USB flash drive has been validated or not (Step S11).

If the activation control function of the USB flash drive has not been validated (NO in Step S11), the activation control process is terminated.

If the activation control function of the USB flash drive has been validated (YES in Step S11), the BIOS 300 performs the process of verifying the signature (Step S12). In the process of verifying the signature, the signature stored in the associated USB flash drive 400 is verified, as will be later explained in detail.

Next, the BIOS 300 determines whether the signature has been duly verified or not (Step S13).

If the signature has found duly verified (YES in Step S13), the BIOS 300 verifies the random key (Step 14).

In this case, the BIOS 300 acquires the random key (first random key) 303 stored in the nonvolatile memory area of the BIOS 300 and the random key (second random key) 404 stored in the associated USB flash drive 400. The BIOS 300 compares the random key 304 and the random key 404, determining whether the random keys 304 and 404 are identical or nor.

On the basis of the result of the comparison, the BIOS 300 determines whether the verification of the random key has been successful or not (Step S15). If the random keys 304 and 404 acquired are found identical to each other, the random key is found successfully verified. On the other hand, if the random keys 304 and 404 are not found identical to each other, the random key is found not successfully verified.

If the random keys are found identical successfully (YES in Step S15), the BIOS 300 generates a new random key (third random key). The random key so generated differs from the random key 304 stored in the nonvolatile memory area of the BIOS 300, and from the random key 404 stored in the associated USB flash drive 400.

The BIOS 300 writes the new random key generated, over the random key 304 stored in the nonvolatile memory area of the BIOS 300 and the random key 404 stored in the associated USB flash drive 400, thereby updating the random key (Step S16).

If the random key is successfully updated (YES in Step S17), the BIOS 300 resets the number (value) of remaining retries in the case where this number written in the nonvolatile memory area of the BIOS 300 has been reduced as will be described later (Step S18).

When Step S18 is performed, the computer 10 is activated (Step S19). The activation control process is then terminated.

On the other hand, if the BIOS 300 determines that the signature has not been duly verified (that is, if the verification fails) in Step S13, the BIOS 300 determines whether the number of retries, written in the nonvolatile memory area of the BIOS 300, is zero or not (Step S20).

If the number of retries is determined to be zero (YES in Step S20), the BIOS 300 deletes the secret data stored in the nonvolatile memory area of the BIOS 300 (Step S21). In other words, if the associated USB flash drive 400 cannot be authenticated (the verification of the signature and the random key fails and the updating of the random fail a preset number of times), the secret data will be deleted.

When Step S21 is performed, the computer 10 is not activated and is, for example, shut down (Step S22). Instead, the computer 10 may wait until a new USB flash drive 400 is plugged into it. In this case, the computer 1 will return to Step S11 and repeat the sequence of steps when the new USB flash drive 400 is plugged into it.

In Step 15, the random key may not be found successfully verified. If this is the case, Step S20 will be performed.

If the random key is not successfully updated in Step S17, Step S20 will be performed, too. Note that the random key is not updated in the case where the random key cannot be written, due to some errors, in the nonvolatile memory area of the BIOS 300 or the associated USB flash drive.

If the number of remaining retries is found not zero in Step S20, Step S21 will not be performed, and the BIOS 300 will reduce, by one, the number of remaining retries (Step S23). In this case, the number of remaining retires, thus reduced by one, is written over the number of remaining retires in the nonvolatile memory area of the BIOS 300. Thereafter, Step S22 is performed.

The sequence of the signature verification step (i.e., Step S12 shown in FIG. 5) will be explained in detail with reference to the flowchart of FIG. 6.

First, the BIOS 300 acquires the USB ID data (second ID data) 401 stored in the associated USB memory 400 (Step S31). The USB ID data 401 contains, for example, the serial number, etc., of the associated USB flash drive 400.

The BIOS 300 then acquires the PC data (first ID data) stored in the nonvolatile memory area of the BIOS 300 (Step S32). The PC data contains the serial number, etc., of the computer 10.

The BIOS 300 acquires the secret data 301 stored in the nonvolatile memory area of the BIOS 300 (Step S33). The secret data 301 is data prepared to generate the signature as described above. The secret data is data stored into the nonvolatile memory area of the BIOS 300 during the above-described process of validating the activation control.

Next, the BIOS 300 generates (calculates) the signature (first authentication data) 303 from the USB ID data 401 acquired in Step S31, the PC data 302 acquired in Step S32 and the secret data 301 acquired in Step S33 (Step S34). Note that the signature 303 is generated in a method similar to the method explained in conjunction with Step S2 shown in FIG. 4.

The BIOS 300 acquires the signature (second authentication data) contained in the signature file 403 that is stored in the associated USB flash drive 400 (Step S35).

The BIOS 300 then compares the signature 305 generated in Step S34 with the signature 402 acquired in Step S35, thereby to verify the signature (Step S36).

On the basis of the result of the comparison, the BIOS 300 acquires the result of verification (i.e., the result of verifying the signature) (Step S37). If the signature 303 and signature 402 generated in Step S34 and Step S35, respectively, are found identical in the Step S36, the verification is successful. On the other hand, the signature 303 and signature 402 generated in Step S34 and Step S35, respectively, may be found not identical in the Step S36. In this case, the verification fails.

When the activation control process is performed as explained with reference to FIG. 5 and FIG. 6, the signature and the random key are successfully verified if the USB flash drive 400 plugged into the computer 10 is a USB flash drive associated with the computer 10 in the process of validating the activation control shown in FIG. 4. The computer 10 can therefore be activated unless the random key fails to be updated.

If the USB flash drive 400 plugged into the computer 10 is not a USB flash drive associated with the computer 10, the verification of the signature and the verification of the random key will fail. In this case, the computer 10 cannot be activated.

As explained above, the activation control process is performed at the time of activating the computer 10. Nonetheless, the activation control process may be periodically performed after the computer 10 has been activated (for example, at intervals of 5 to 60 minutes). If the USB flash drive 400 is not plugged into the computer 10 when such a periodical activation control, process is performed, the computer 10 may display a message that prompts the user to plug the associated USB flash drive 400 into the computer 10.

In the activation control process so performed periodically, the computer 10 stays activated if both the signature and the random key are successfully verified. If the signature or the random key is not verified, the computer 10 will be shut down. (That is, the computer 10 will be deactivated.)

As described above, the USB ID data 401 inherent to the USB flash drive 400 plugged into the computer 10 is acquired, and the signature 303 is then generated from the secret data 301 and PC data 302 stored in the nonvolatile memory area of the BIOS 300 and the USB ID data 401. Next, it is determined whether the signature 303 thus generated is identical to the signature 402 stored in the USB flash drive 400. If the signature 303 is found identical to the signature 402, it is determined whether the random key 304 stored in the nonvolatile memory area of the BIOS 300 is identical to the random key 404 stored in the USB flash drive 400. If the random key 304 is found identical to the random key 404, the computer 10 is activated. Hence, in this embodiment, only the person who has the USB flash drive 400 associated with the computer 10 can activate the computer 10.

More specifically, not only the signature, but the random key is verified in this embodiment. Therefore, even if two or more USB flash drives storing the same USB ID data (for example, a serial number) exist, the random key cannot be verified unless the USB flash drive 400 associated with the computer 10 is plugged into the computer 10. The USB flash drive 400 associated with the computer 10 can therefore be authenticated more reliably than otherwise.

Further, in this embodiment, the secret data 301, PC data 302 and random key 304 are stored in the nonvolatile memory area of the BIOS 300, and the BIOS 300 performs the activation control process (that is, the BIOS 300 has the function of performing the activation control process). The embodiment being so configured, the BIOS 300 can perform the activation control process even if the HDD 109 is replaced with another in the computer 10.

Still further, the secret data 301 stored in the nonvolatile memory area of the BIOS 300 is deleted in this embodiment if the signature 303 generated by the BIOS 300 is not identical to the signature 402 stored in the USB flash drive 400, or if the random key 304 stored in the nonvolatile memory area of the BIOS 300 is not identical to the random key 404 stored in the USB flash drive 400. Therefore, the BIOS 300 can no longer generate the signature 303 if the authentication of the USB flash drive 400 fails more times than prescribed number of times. In this case, the computer 10 cannot be activated at all. This ensures the data security of the computer 10.

Moreover, in this embodiment, if the random key 304 stored in the random key 304 stored in the nonvolatile memory area of the BIOS 300 is found identical to the random key 404 stored in the USB flash drive 400, the random key 304 stored in the nonvolatile memory area of the BIOS 300 and the random key 404 stored in the USB flash drive 400 are updated to new random keys. The computer 10 and the USB flash drive 400 can therefore be associated in a one-to-one relationship, more reliably than in the case where both the BIOS 300 and the USB flash drive 400 keep storing the same random key.

Further, since the activation control process is periodically performed in this embodiment, only the person who has the USB flash drive 400 associated with the computer 10 can use the computer 10 once the computer 10 has been activated.

In the embodiment described above, both the signature and the random key are verified in the activation control process. Nonetheless, the manager, for example, may select a mode of verifying the random key or a mode of not verifying the random key. The system can be set to the mode of not verifying the random key, because the USB flash drive 400 can be authenticated if the PC data 302 and the USB ID data 401 are inherent to the computer 10 and the USB flash drive 400, respectively. In this case, Step S4 may be skipped in the process of validating the activation control (FIG. 4).

As has been described, the sequence of the activation control process can be implemented by the activation control program. Hence, if this program is installed in an ordinary computer by way of a computer-readable storage medium and is then executed in the computer, the same advantage as achieved with this embodiment can be attained.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing apparatus comprising:
   a storage module configured to store secret data for generating authentication data, first identification data of the data processing apparatus, and a first random key comprising a random value;
   an acquisition module configured to acquire second identification data of a removable medium connected to the data processing apparatus;
   a generation module configured to generate first authentication data from the secret data and the first identification data, both stored in the storage module, and the second identification data acquired by the acquisition module;
   a first verification module configured to determine whether the generated first authentication data and a second authentication data stored in the removable medium are identical;
   a second verification module configured to determine whether the first random key stored in the storage module and a second random key stored in the removable medium are identical, if the first authentication data and the second authentication data are identical; and
   an activation module configured to activate the data processing apparatus if the first and second random keys are identical.

2. The data processing apparatus of claim 1, wherein:
   the storage module is configured to have a nonvolatile memory area managed by BIOS running on the data processing apparatus;
   the secret data, the first ID data and the first random key are configured to be stored in the nonvolatile memory area of the storage module; and
   the BIOS configured to have the acquisition module, the generation module, the first and second verification modules and the activation module.

3. The data processing apparatus of claim 1, further comprising a deletion module configured to delete the secret data stored in the storage module if the first authentication data and the second authentication data are not identical or if the first and second random keys are not identical.

4. The data processing apparatus of claim 1, further comprising an update module, and wherein:
   the removable medium is configured to be able to rewrite various data; and
   the update module is configured to update the first and second random keys stored in the storage module and the removable media, respectively, to a third random key if the first and second random keys are identical.

5. The data processing apparatus of claim 1, further comprising an activation termination module, and wherein:
   the acquisition module, the generation module, the first verification module and the second verification module are configured to be periodically operated after the data processing apparatus has been activated; and
   the activation termination module is configured to stop the activation of the data processing apparatus if the first authentication data and the second authentication data are not identical by the first verification module operated periodically or if the first and second random keys are not identical by the second verification module operated periodically.

6. An activation control method for use in a data processing apparatus having a storage module configured to store secret data for generating authentication data, first identification data of the data processing apparatus, and a first random key comprising a random value, the method comprising:
- acquiring second identification data of a removable medium connected to the data processing apparatus;
- generating first authentication data from the secret data and the first identification data, both stored in the storage module, and the acquired second identification data;
- determining whether the generated first authentication data and a second authentication data stored in the removable medium are identical;
- determining whether the first random key stored in the storage module and a second random key stored in the removable medium are identical, if the first authentication data and the second authentication data are identical; and
- activating the data processing apparatus if the first and second random keys are identical.

7. A computer-readable, non-transitory storage medium having stored thereon a computer program which is executable by a computer comprising a storage module storing secret data for generating authentication data, first identification data of the data processing apparatus, and a first random key comprising a random value, the computer program controlling the computer to execute functions of:
- acquiring second identification data of a removable medium connected to the computer;
- generating first authentication data from the secret data and the first identification data, both stored in the storage module, and the acquired second identification data;
- determining whether the generated first authentication data and a second authentication data stored in the removable medium are identical;
- determining whether the first random key stored in the storage module and a second random key stored in the removable medium are identical, if the first authentication data and the second authentication data are identical; and
- activating the computer if the first and second random keys are identical.

* * * * *